(12) United States Patent
In et al.

(10) Patent No.: US 12,506,365 B2
(45) Date of Patent: Dec. 23, 2025

(54) WIRELESS POWER TRANSFER

(71) Applicant: SAMSUNG ELECTRONICS CO., LTD., Suwon-si (KR)

(72) Inventors: Sol Hee In, Suwon-si (KR); Do Hyung Kim, Suwon-si (KR); Jae Sup Lee, Suwon-si (KR); Byung Wook Jung, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 18/650,865

(22) Filed: Apr. 30, 2024

(65) Prior Publication Data
US 2025/0062643 A1    Feb. 20, 2025

(30) Foreign Application Priority Data
Aug. 18, 2023 (KR) .................. 10-2023-0108129

(51) Int. Cl.
*H02J 50/27* (2016.01)
*H02J 50/40* (2016.01)

(52) U.S. Cl.
CPC ............ *H02J 50/27* (2016.02); *H02J 50/402* (2020.01)

(58) Field of Classification Search
CPC .......... H02J 50/27; H02J 50/402; H02J 50/20
See application file for complete search history.

(56) References Cited

U.S. PATENT DOCUMENTS

| | | | |
|---|---|---|---|
| 7,956,572 B2 | 6/2011 | Zane et al. | |
| 10,097,051 B2 | 10/2018 | Guo et al. | |
| 10,523,276 B2 * | 12/2019 | Stone | H04B 5/79 |
| 11,133,576 B2 * | 9/2021 | Carter | H01Q 9/0421 |
| 2008/0298100 A1 * | 12/2008 | Esaka | H04B 5/79 363/67 |
| 2011/0157934 A1 * | 6/2011 | Clemo | H02J 1/102 363/71 |
| 2018/0062419 A1 * | 3/2018 | Park | H02J 1/102 |
| 2018/0198320 A1 | 7/2018 | Criswell et al. | |

FOREIGN PATENT DOCUMENTS

| | | |
|---|---|---|
| JP | 2014036484 | 2/2014 |
| JP | 2015130779 | 7/2015 |
| KR | 20130056941 | 5/2013 |
| KR | 20160076976 | 7/2016 |
| KR | 101814556 | 1/2018 |

* cited by examiner

*Primary Examiner* — John W Poos
(74) *Attorney, Agent, or Firm* — Fish & Richardson P.C.

(57) ABSTRACT

The present disclosure relates to power receiving devices and methods. An example power receiving device comprises an antenna cell array configured to receive a radio frequency (RF) signal from a transmission device, where the antenna cell array includes a first antenna cell and a second antenna cell, a first rectifier connected to the first antenna cell and having first maximum rectification efficiency when an input signal of the first rectifier has a first power value, a second rectifier connected to the second antenna cell and having second maximum rectification efficiency when an input signal of the second rectifier has a second power value different from the first power value, a first voltage converter configured to perform a first conversion of an output of the first rectifier, and a second voltage converter configured to perform a second conversion of an output of the second rectifier.

20 Claims, 11 Drawing Sheets

WIRELESS POWER TRANSFER

CROSS-REFERENCE TO RELATED APPLICATION

This application claims priority, under 35 U.S.C. 119, from Korean Patent Application No. 10-2023-0108129 filed on Aug. 18, 2023 in the Korean Intellectual Property Office, the entire contents of which are herein incorporated by reference.

BACKGROUND

WPT (Wireless Power Transfer) is a technology that may transmit power wirelessly without a wire. It is difficult for conventional circuits used for the wireless power transfer to receive broadband input power at a high-efficiency.

SUMMARY

The present disclosure relates to wireless power transfer. In particular, the present disclosure relates to power receiving devices and power receiving methods, including a power receiving device and a power receiving method with improved reception efficiency.

The subject matter of the present disclosure is not limited to the above-mentioned uses and advantages. Other uses and advantages may be understood based on following description.

In general, according to some aspects, a power receiving device comprises: an antenna cell array for receiving a radio frequency (RF) signal from a transmission device, wherein the antenna cell array includes a first antenna cell disposed in a center area of the array and a second antenna cell disposed in an edge area of the array; a first rectifier connected to the first antenna cell and having maximum rectification efficiency when a power value of an input signal has a first value; a second rectifier connected to the second antenna cell and having maximum rectification efficiency when a power value of an input signal has a second value different from the first value; a first voltage converter configured to perform a first conversion of an output of the first rectifier; and a second voltage converter configured to perform a second conversion of an output of the second rectifier.

In general, according to some aspects, a method for receiving power comprises: receiving, by an antenna cell array, a RF signal from a transmission device, wherein the antenna cell array includes a first antenna cell disposed in a center area of the array and a second antenna cell disposed in an edge area of the array; performing, by a first rectifier, a first rectification of the RF signal received through the first antenna cell, wherein the first rectifier has maximum rectification efficiency when a power value of an input signal has a first value; performing, by a second rectifier, a second rectification of the RF signal received through the second antenna cell, wherein the second rectifier has maximum rectification efficiency when a power value of an input signal has a second value different from the first value; performing, by a first voltage converter, a first conversion of an output of the first rectifier; performing, by a second voltage converter, a second conversion of an output of the second rectifier, wherein the second conversion is different from the first conversion; and charging a battery using an output of the first voltage converter and an output of the second voltage converter.

In general, according to some aspects, a power receiving device comprises: an antenna cell for receiving an RF signal from a transmission device; a first rectifier connected to the antenna cell and having maximum rectification efficiency when a power value of an input signal has a first value: a second rectifier connected to the antenna cell and having maximum rectification efficiency when a power value of an input signal has a second value different from the first value; and a voltage converter configured to convert at least one of an output of the first rectifier or an output of the second rectifier and to charge a battery using the converting result.

Details of other implementations are included in the detailed description and drawings.

BRIEF DESCRIPTION OF THE DRAWINGS

The above and other aspects and features of the present disclosure will become more apparent by describing in detail illustrative implementations thereof with reference to the attached drawings, in which.

DETAILED DESCRIPTION

Figure 1:
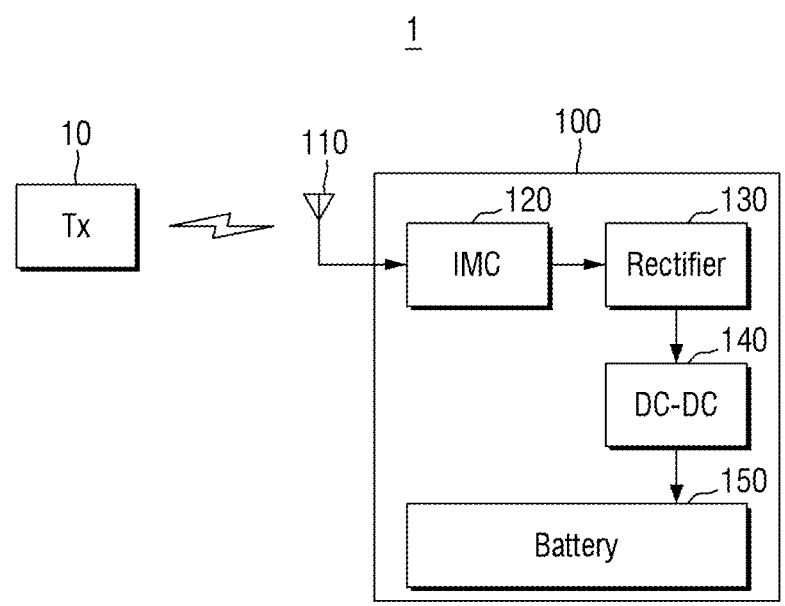
FIG. 1 is a diagram illustrating an example of a power transmission system.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various implementations are illustrated and described further below. It will be understood that the description herein is not intended to limit the claims to the specific implementations described. On the contrary, it is intended to cover alternatives, modifications, and equivalents as may be included in the spirit and scope of the present disclosure as defined by the appended claims.

A shape, a size, a ratio, an angle, a number, etc. disclosed in the drawings for illustrating implementations of the present disclosure are examples, and the present disclosure is not limited thereto. The same reference numerals refer to the same elements herein.

The terminology used herein is for the purpose of describing particular implementations only and is not intended to limit the present disclosure. As used herein, the singular forms "a" and "an" are intended to include the plural forms as well, unless the context clearly indicates otherwise. It will be further understood that the terms "comprise", "comprising", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify an entirety of list of elements and may not modify the individual elements of the list. When referring to "C to D", this means C inclusive to D inclusive unless otherwise specified.

It will be understood that, although the terms "first", "second", "third", and so on may be used herein to illustrate various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Unless otherwise defined, all terms including technical and scientific terms used herein have the same meaning as commonly understood by one of ordinary skill in the art to which this concept described herein belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In one example, when a certain implementation may be implemented differently, a function or operation specified in a specific block may occur in a sequence different from that specified in a flowchart. For example, two consecutive blocks may be actually executed at the same time. Depending on a related function or operation, the blocks may be executed in a reverse sequence.

In descriptions of temporal relationships, for example, temporal precedent relationships between two events such as "after", "subsequent to", "before", etc., another event may occur therebetween unless "directly after", "directly subsequent" or "directly before" is not indicated. The features of the various implementations of the present disclosure may be partially or entirely combined with each other, and may be technically associated with each other or operate with each other.

Hereinafter, implementations according to the technical idea of the present disclosure will be described with reference to the attached drawings.

FIG. 1 is a diagram illustrating an example of a power transmission system.

Referring to FIG. 1, a power transmission system 1 includes a transmission device 10 and a power receiving device 100.

The transmission device 10 may transmit a radio frequency (RF) signal to the power receiving device 100, for example, for charging a battery 150. The transmission device 10 may be various electronic devices capable of transmitting the RF signal to the power receiving device 100. In some implementations, the transmission device 10 may include a base station, a wireless power supply device, a satellite, etc. However, implementations are not limited thereto.

The power receiving device 100 may include an antenna cell array 110, an impedance matching circuit 120, a rectifier 130, and a voltage converter 140. In some implementations, the power receiving device 100 may be modified so as to include additional components as not shown.

The antenna cell array 110 may be configured to include a plurality of antenna cells and may receive the RF signal transmitted from the transmission device 10.

The impedance matching circuit 120 may perform impedance matching while being disposed between the antenna cell array 110 and the rectifier 130. To this end, the impedance matching circuit 120 may be implemented using a coil and a capacitor. However, an implementation is not limited thereto.

The rectifier 130 may rectify the RF signal transmitted from the transmission device 10 to generate a DC voltage. The rectifier 130 may play the role of an RF-DC converter or a rectenna.

The voltage converter 140 may convert the DC voltage generated from the rectifier 130 to charge the battery 150. When the rectifier 130 has generated the DC voltage via the rectification, the voltage converter 140 may perform up-conversion to raise a level of the DC voltage generated from rectifier 130, or perform down-conversion to lower the level of the DC voltage generated from the rectifier 130.

In this implementation, the transmission device 10 may transmit the RF signal to the power receiving device 100 using beam forming.

Furthermore, the transmission device 10 may transmit the RF signal to the power receiving device 100 using a time-reversal algorithm. Hereinafter, this will be described in more detail with reference to FIG. 2.

Figure 2:
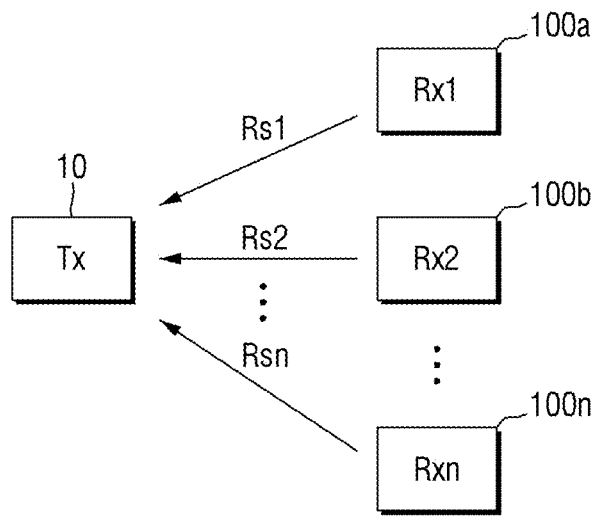
FIG. 2 is a diagram for illustrating an example operation of a transmission device in FIG. 1.

FIG. 2 is a diagram for illustrating an example operation of the transmission device in FIG. 1.

Referring to FIG. 2, the transmission device 10 receives response signals RS1 to RSn from n (n being a natural number) candidate power receiving devices 100a to 100n to which the transmission device 10 is to transmit the RF signal. Then, the transmission device 10 transmits the RF signal to the candidate power receiving device that can transmit the greatest power using phase conjugate and amplitude conjugate based on the response signals RS1 to RSn of the candidate power receiving devices 100a to 100n.

Figure 3:
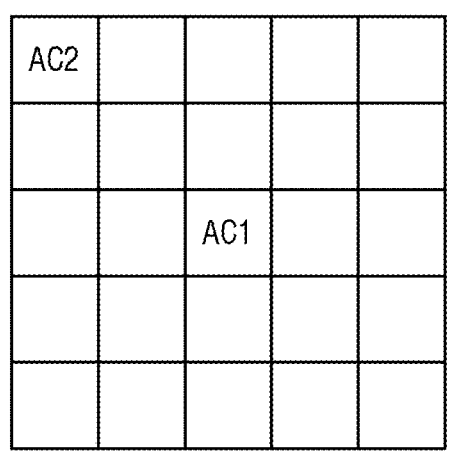
FIG. 3 is a diagram for illustrating an example antenna cell array of a power receiving device in FIG. 1.

FIG. 3 is a diagram for illustrating an example antenna cell array of the power receiving device in FIG. 1.

Referring to FIG. 3, an antenna cell array 110 includes, for example, 5×5 antenna cells.

Although FIG. 3 shows a square shaped antenna cell array 110 including 25 antenna cells. However, implementations are not limited thereto. In some implementations, the shape of the antenna cell array 110 may be modified into a circular, oval shape, etc., and the number of antenna cells may also be modified as desired.

The plurality of antenna cells may include a first antenna cell AC1 disposed in a center area of the antenna cell array 110 and a second antenna cell AC2 disposed in an edge area of the antenna cell array 110.

Figure 4:
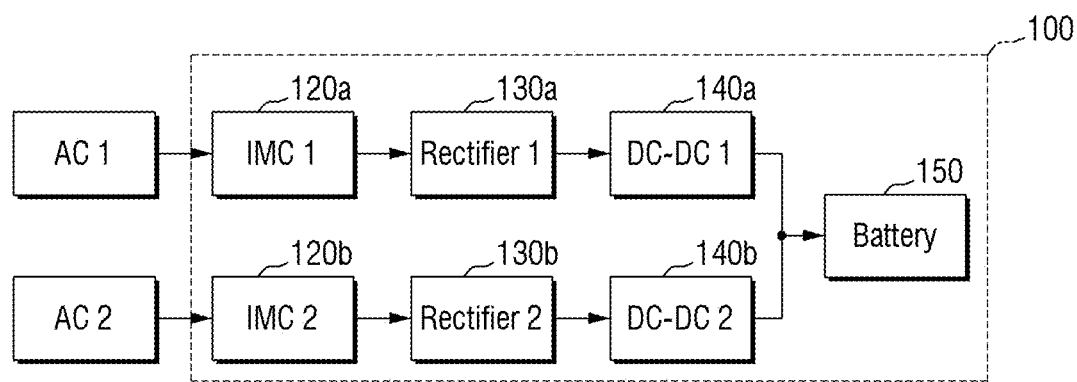
FIG. 4 is an example diagram for illustrating the power receiving device in FIG. 1.
Figure 5:
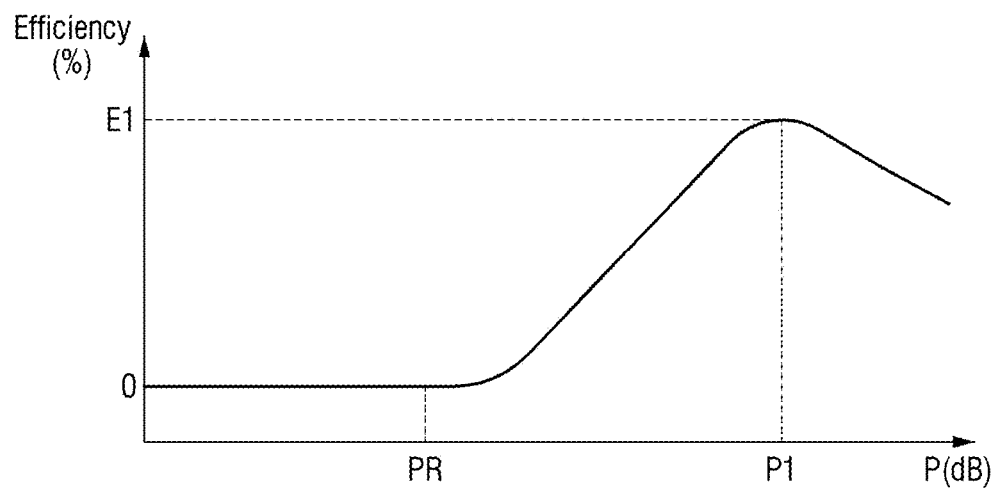
FIG. 5 and FIG. 6 are diagrams for illustrating example rectifiers included in the power receiving device in FIG. 1.
Figure 6:
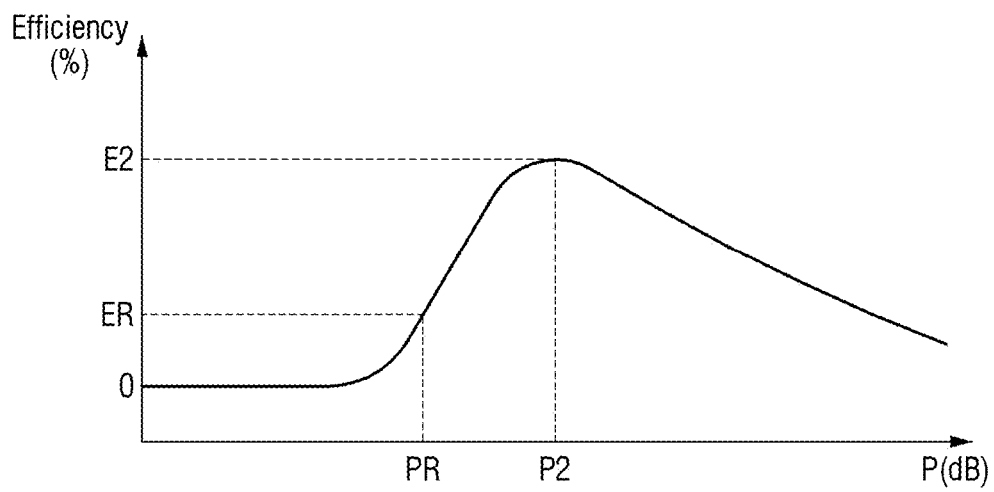

FIG. 4 is an example diagram for illustrating the power receiving device in FIG. 1. FIG. 5 and FIG. 6 are diagrams for illustrating example rectifiers included in the power receiving device in FIG. 1.

First, referring to FIGS. 3 and 4, a first impedance matching circuit 120a, a first rectifier 130a, and a first voltage converter 140a may be connected to the first antenna cell AC1.

Further, a second impedance matching circuit 120b, a second rectifier 130b, and a second voltage converter 140b may be connected to the second antenna cell AC2.

In some implementations, a separate first buffer circuit may be disposed between the first rectifier 130a and the first voltage converter 140a and may be configured to optimize an output load of the first rectifier 130a and an input impedance of the first voltage converter 140a.

Furthermore, a separate second buffer circuit may be disposed between the second rectifier 130b and the second voltage converter 140b and may be configured to optimize an output load of the second rectifier 130b and an input impedance of the second voltage converter 140b.

The first rectifier 130a may not be connected to the second antenna cell AC2. Accordingly, the first rectifier 130a may perform a rectification operation only on the RF signal received through the first antenna cell AC1, and may not perform a rectification operation on the RF signal received through the second antenna cell AC2.

Furthermore, the second rectifier 130b may not be connected to the first antenna cell AC1. Accordingly, the second rectifier 130b may perform a rectification operation only on the RF signal received through the second antenna cell AC2, and may not perform a rectification operation on the RF signal received through the first antenna cell AC1. That is, different rectifiers corresponding to different antenna cells may perform the rectification operation related to the different antenna cells.

Referring to FIG. 4 and FIG. 5, the first rectifier 130a may have a rectification efficiency as shown in FIG. 5 based on a power value of an input signal thereto. For example, the first rectifier 130a may have a maximum rectification efficiency E1 when the power value of the input signal thereto is P1, and may have a rectification efficiency close to 0 when the power value of the input signal thereto is PR. That is, when the power of the input signal thereto is PR, it is difficult for the first rectifier 130a to generate the DC voltage from the received RF signal.

Next, referring to FIG. 4 and FIG. 6, the second rectifier 130b may have a rectification efficiency as shown in FIG. 6 based on a power value of an input signal thereto. For example, the second rectifier 130b may have a maximum rectification efficiency E2 when the power value of the input signal thereto is P2. In this regard, P2 may be a smaller value than P1. In other words, the power value of the input signal to the second rectifier 130b at which the second rectifier 130b has the maximum rectification efficiency is smaller than the power value of the input signal to the first rectifier 130a at which the first rectifier 130a has the maximum rectification efficiency.

In some implementations, the rectification efficiency E2 may be smaller than the rectification efficiency E1. However, implementations are not limited thereto.

In one example, the second rectifier 130b may have the rectification efficiency of ER when the power value of the input signal thereto is PR. In other words, when the power value of the input signal thereto is PR, it is difficult for the first rectifier 130a to generate the DC voltage from the received RF signal, as described above, whereas when the power value of the input signal thereto is PR, the second rectifier 130b can generate the DC voltage from the received RF signal.

In some implementations, P1 may be a value of 20 dB or greater, and P2 may be a value of −10 dB or smaller. However, implementations are not limited thereto.

Figure 7:
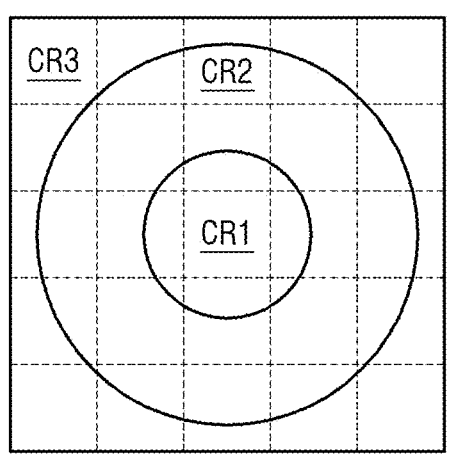
FIG. 7 and FIG. 8 are diagrams for illustrating example characteristics of a RF signal received by an antenna cell array in FIG. 1.
Figure 8:
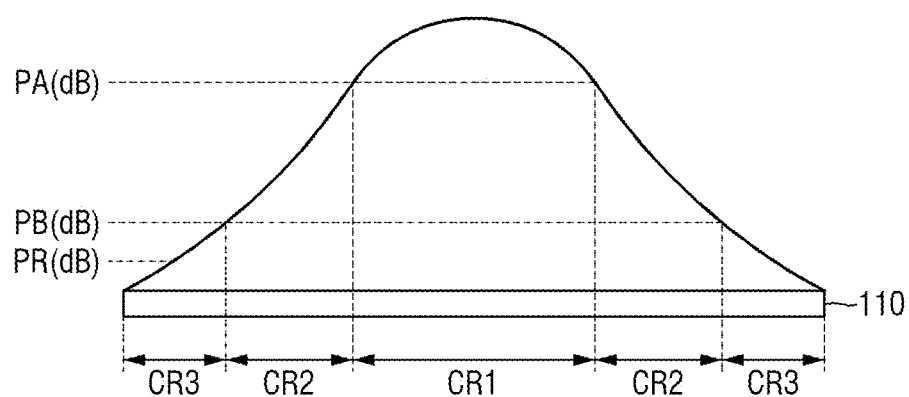

FIG. 7 and FIG. 8 are diagrams for illustrating example characteristics of the RF signal received by the antenna cell array in FIG. 1.

FIG. 7 and FIG. 8 are graphs showing a power distribution of the RF signal received by the antenna array when the transmission device transmits the RF signal, for example, using beam forming.

Referring to FIG. 7 and FIG. 8, the power value of the RF signal received by the antenna array 110 tends to decrease as a position of the antenna cell is displaced from the center area to the edge area of the antenna array 110. For example, a beamforming waveform with a physical waveform has a form in which the straightness of the beam is the greatest at the center area and the beam radiates around the center area.

An area inside a first concentric circle with a first radius and having the center area of the antenna array 110 as a center of the circle is defined as a first area CR1. An area inside a second concentric circle with a second radius larger than the first radius and having the center area of the antenna array 110 as a center of the circle but outside the first concentric circle is defined as a second area CR2. Further, an area outside the second concentric circle may be defined as a third area CR3.

In this regard, the power value of the RF signal received by the antenna cell disposed in the first area CR1 is greater than or equal to PA dB and is the largest. The power value of the RF signal received by the antenna cell disposed in the second area CR2 is a value between PB dB and PA dB. The power value of the RF signal received by the antenna cell disposed in the third area CR3 is smaller than or equal to PB dB and is the smallest.

Therefore, when the first rectifier 130a having the rectification efficiency as shown in FIG. 5 is connected to the antenna cell disposed in the third area CR3, voltage generation efficiency of the power receiving device 100 is reduced because as shown in FIG. 5, the rectification efficiency when the power value of the received RF signal is PR dB is close to 0, and thus the rectification operation thereof may hardly be performed.

Conversely, when the second rectifier 130b having the rectification efficiency as shown in FIG. 6 is connected to the antenna cell disposed in the first area CR1, the voltage generation efficiency of the power receiving device 100 decreases because the rectification efficiency thereof decreases when the received RF signal has a high power value larger than or equal to P2 dB.

Therefore, in this implementation, in order to maximize the voltage generation efficiency of the power receiving device 100 based on the power distribution of the RF signal received by the antenna array 110, the first rectifier 130a having the rectification efficiency as shown in FIG. 5 is connected to the antenna cell disposed in the first area CR1, and the second rectifier 130b having the rectification efficiency as shown in FIG. 6 is connected to the antenna cell disposed in the third area CR3 to perform the rectification operation. Accordingly, the voltage generation efficiency of the power receiving device 100 may be increased.

Figure 9:
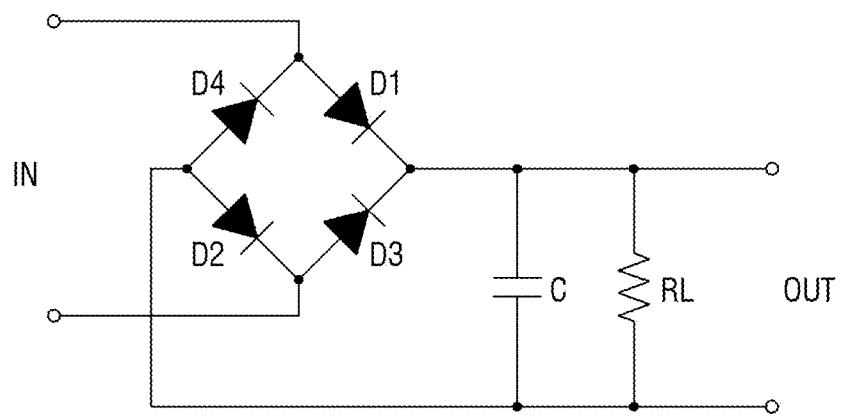
FIG. 9 to FIG. 11 are illustrative circuit diagrams of example rectifiers included in the power receiving device in FIG. 1.
Figure 10:
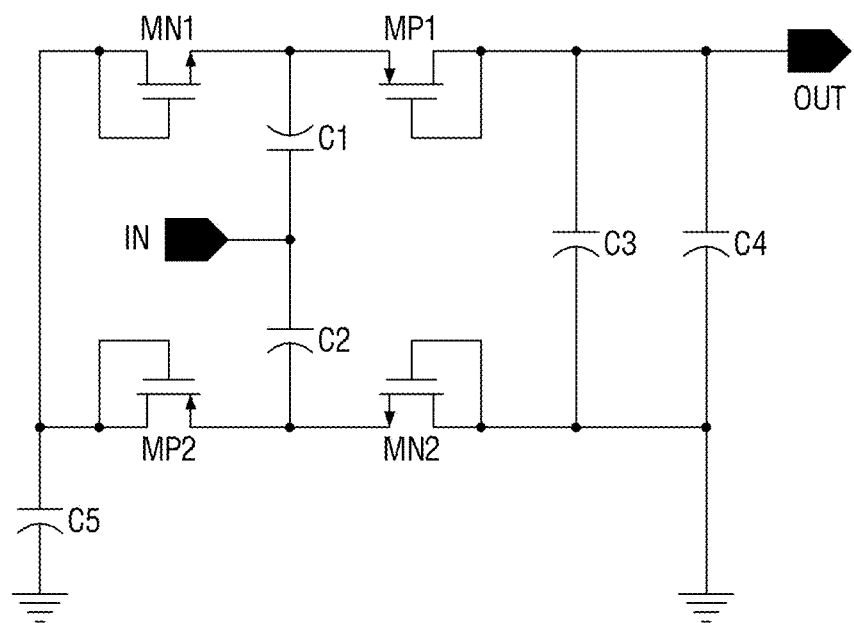
Figure 11:
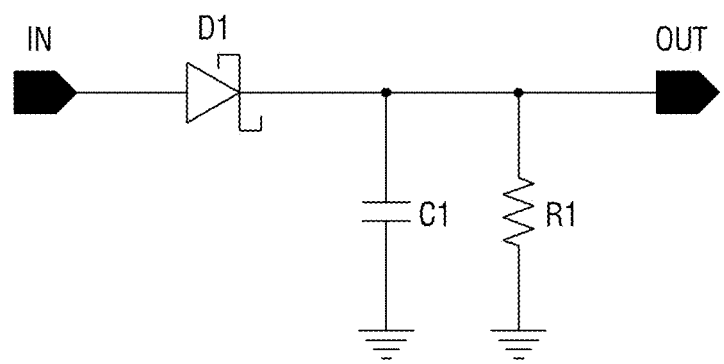

In some implementations, the first rectifier 130a having the rectification efficiency as shown in FIG. 5 and the second rectifier 130b having the rectification efficiency as shown in FIG. 6 may be implemented using different circuits. Referring to FIG. 9 to FIG. 11, hereinafter, illustrative circuits that may respectively implement the first rectifier 130a and the second rectifier 130b are described.

FIG. 9 to FIG. 11 are illustrative circuit diagrams of example rectifiers included in the power receiving device in FIG. 1.

First, referring to FIG. 9, FIG. 9 is a diagram showing a bridge rectification circuit.

The bridge rectification circuit may include four diodes D1 to D4 connected to an input terminal IN, a capacitor C, and a load resistor RL. The RF signal input to the input terminal IN through the antenna cell may be rectified through the four diodes D1 to D4, may be charged to the capacitor C, and may be output through an output terminal OUT in a form of a predetermined DC voltage.

Referring to FIG. 10, FIG. 10 is a diagram showing a 2 Dickson charge pump circuit.

The 2 Dickson charge pump may include transistors MN1, MN2, MP1, and MP2 and capacitors C1 to C5.

The capacitor C1 may be connected to and disposed between the input terminal IN and a source terminal of the transistor MN1 and a source terminal of the transistor MP1. The capacitor C2 may be connected to and disposed between the input terminal IN and a source terminal of the transistor MN2 and a source terminal of the transistor MP2.

A drain terminal of the transistor MN1 may be connected to a gate terminal thereof, a drain terminal of the transistor MN2 may be connected to a gate terminal thereof, a drain terminal of the transistor MP1 may be connected to a gate terminal thereof, and a drain terminal of the transistor MP2 may be connected to a gate terminal thereof.

The capacitor C5 may be connected to the drain terminal of the transistor MN1 and the drain terminal of the transistor MP2.

Each of the capacitors C3 and C4 may be connected to the drain terminal of the transistor MN2 and the drain terminal of the transistor MP1.

The RF signal input to the input terminal IN through the antenna cell may be rectified through the four transistors MN1, MN2, MP1, and MP2, and may be charged to the capacitors C3 and C4, and may be output through the output terminal OUT in a form of a predetermined DC voltage.

Referring to FIG. 11, FIG. 11 is a diagram showing a Schottky diode circuit.

The Schottky diode circuit may include a Schottky diode D1, a capacitor C1, and a resistor R1.

The RF signal input to the input terminal IN through the antenna cell may be rectified through the Schottky diode D1, and may be charged to the capacitor C1, and may be output through the output terminal OUT in a form of a predetermined DC voltage.

In some implementations, the first rectifier 130a and the second rectifier 130b may be respectively implemented as different circuits among the circuits as described above.

For example, the first rectifier 130a may be implemented as the bridge rectification circuit, and the second rectifier 130b may be implemented as the Schottky diode circuit. Alternatively, for example, the first rectifier 130a may be implemented as the bridge rectification circuit and the second rectifier 130b may be implemented as the 2 Dickson charge pump circuit.

Alternatively, for example, the first rectifier 130a may be implemented as the 2 Dickson charge pump circuit and the second rectifier 130b may be implemented as the Schottky diode circuit. Alternatively, for example, the first rectifier 130a may be implemented as the Schottky diode circuit and the second rectifier 130b may be implemented as the 2 Dickson charge pump circuit.

However, implementations are not limited thereto, and the different rectification circuits with different rectification efficiencies as described above may be respectively used to implement the first rectifier 130a and the second rectifier 130b.

In some implementations, the first rectifier 130a having the rectification efficiency as shown in FIG. 5 and the second rectifier 130b having the rectification efficiency as shown in FIG. 6 may be implemented as different rectification circuits including different materials.

For example, the first rectifier 130a may be formed using a substrate including a first material, and the second rectifier 130b may be formed using a substrate including a second material different from the first material. In other words, in order to implement the different rectification circuits with the different rectification efficiencies, the rectification circuits may be implemented using different substrates made of different materials, respectively.

In some implementations, the first material may include Si and the second material may include an oxide semiconductor material. The oxide semiconductor material may include, for example, GaN and GaAs. However, implementations are not limited thereto.

In some implementations, the first rectifier 130a having the rectification efficiency as shown in FIG. 5, and the second rectifier 130b having the rectification efficiency as shown in FIG. 6 may be implemented based on different combinations of the circuit configurations and the constituent materials as described above.

For example, the first rectifier 130a and the second rectifier 130b may be implemented using the same circuit configuration and different substrates including different materials, or may be implemented using different circuit configurations and the same substrate including the same material.

Figure 12:
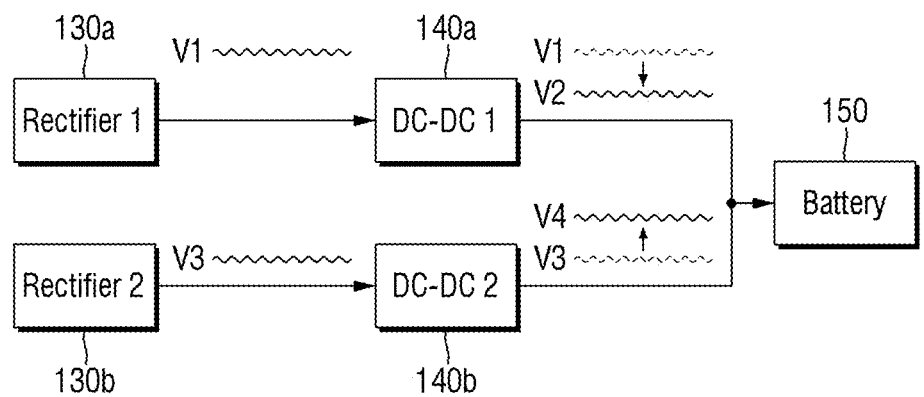
FIG. 12 is a diagram for illustrating an example operation of voltage converters included in the power receiving device in FIG. 1.

FIG. 12 is a diagram for illustrating an example operation of the voltage converters included in the power receiving device in FIG. 1.

Referring to FIG. 12, the first rectifier 130a may generate and output a relatively high level DC voltage V1 under the operation as described above, and the second rectifier 130b may generate and output a relatively low level DC voltage V3 under the operation as described above.

Accordingly, in order to generate an appropriate DC voltage for charging the battery 150, the first voltage converter 140a may perform down-conversion to convert the DC voltage V1 as the output of the first rectifier 130*a* to a DC voltage V2 as shown in FIG. 12.

In one example, in order to generate an appropriate DC voltage for charging the battery 150, the second voltage converter 140*b* may perform up-conversion to convert the DC voltage V3 as the output of the second rectifier 130*b* to a DC voltage V4 as shown in FIG. 12.

Figure 13:
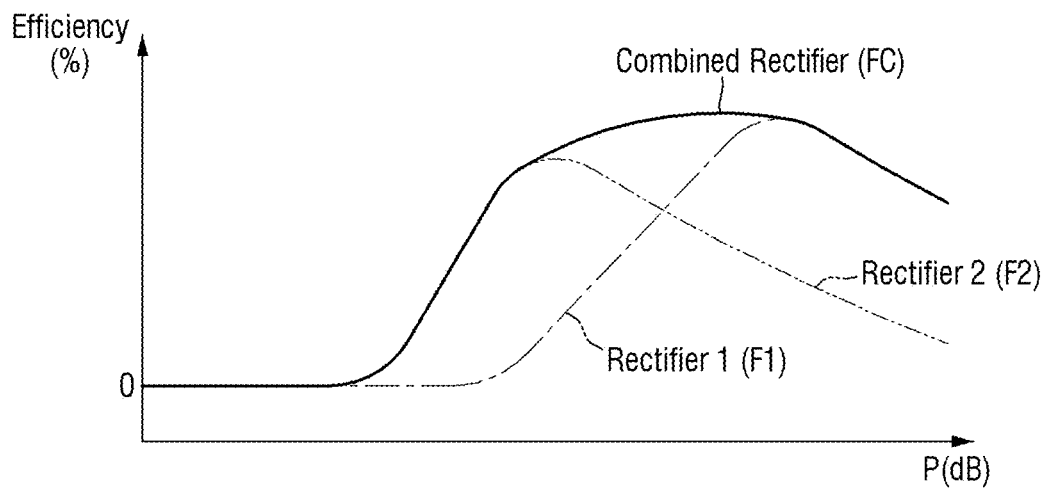
FIG. 13 is a diagram for illustrating effects of an example of a power transmission system.

FIG. 13 is a diagram for illustrating effects of an example of a power transmission system.

Referring to FIG. 13, in the power receiving device 100, the first rectifier 130*a* having first rectification efficiency characteristics F1 is connected to the antenna cell disposed in the center area of the antenna cell array 110, and the second rectifier 130*b* having second rectification efficiency characteristics F2 is connected to the antenna cell disposed in the edge area of the antenna cell array 110, and perform individual rectification operations. Thus, rectification efficiency characteristics FC as a combination of the first rectification efficiency characteristics F1 and the second rectification efficiency characteristics F2 may be secured. Accordingly, the rectification efficiency of the power receiving device 100 may be improved.

Figures 14, 15:
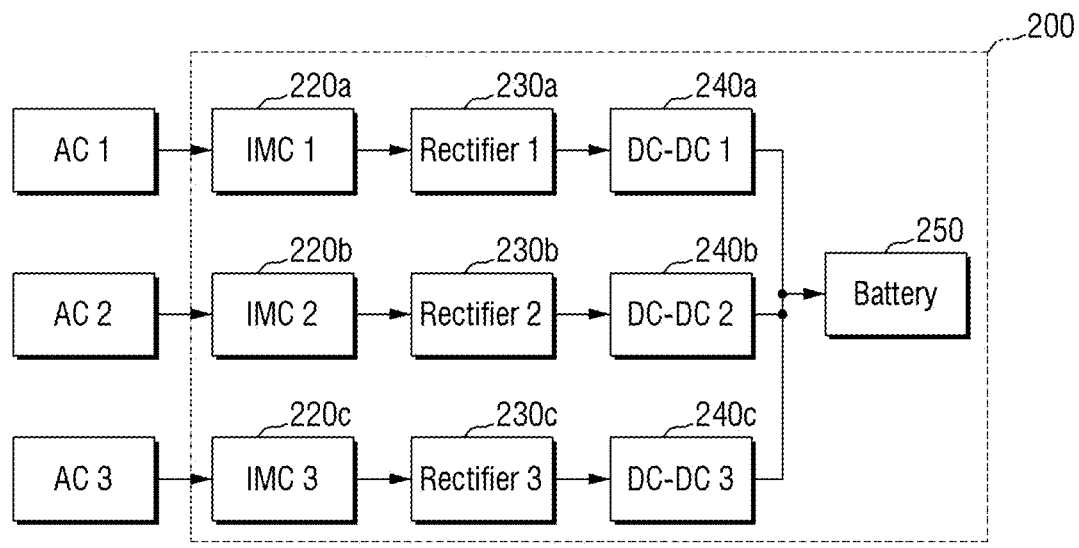
FIG. 14 to FIG. 16 are diagrams for illustrating an example of a power receiving device.
Figure 16:
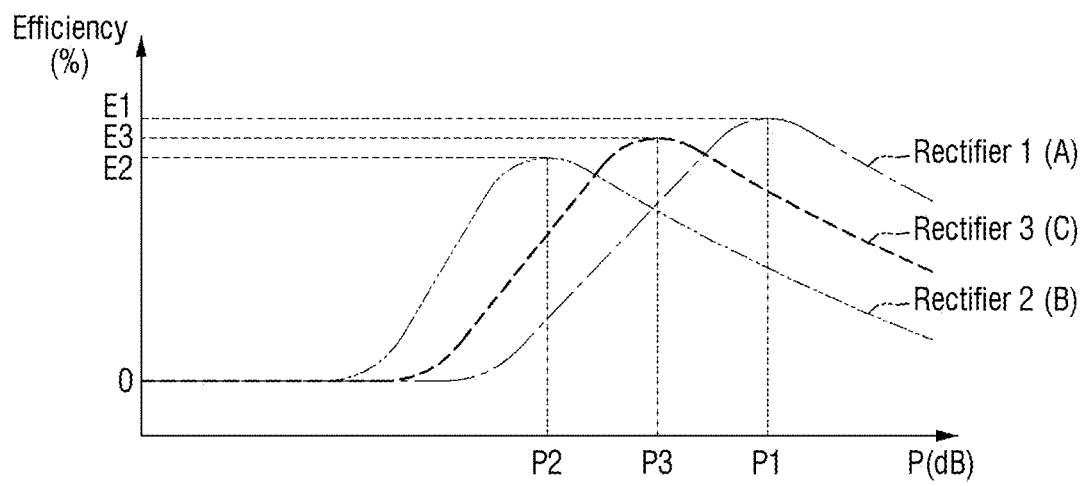

FIG. 14 to FIG. 16 are diagrams for illustrating an example of a power receiving device.

Hereinafter, descriptions that are duplicate with those of the previously described implementations will be omitted, and differences therebetween will be mainly described.

Referring to FIG. 14 and FIG. 15, an antenna cell array 210 of a power receiving device 200 includes a plurality of antenna cells.

The plurality of antenna cells may include the first antenna cells AC1 disposed in the center area of the antenna cell array 210, the second antenna cells AC2 disposed in the edge area of the antenna cell array 210, and third antenna cells AC3 disposed between the first antenna cell AC1 and the second antenna cell AC2.

FIG. 14 shows an illustrative arrangement in which first to third antenna cells AC1, AC2, and AC3 are arranged in the antenna cell array 210 including 5×5 antenna cells.

Referring to FIG. 14, in a first row Row 1, the second antenna cell AC2, the third antenna cell AC3, the first antenna cell AC1, the third antenna cell AC3, and the second antenna cell AC2 may be disposed at a first column Col 1 to a fifth column Col 5, respectively. In a second row Row 2, the third antenna cell AC3, the first antenna cell AC1, the first antenna cell AC1, the first antenna cell AC1, and the third antenna cell AC3 may be disposed at a first column Col 1 to a fifth column Col 5, respectively. In a third row Row 3, the first antenna cells AC1 may be disposed in a first column Col 1 to a fifth column Col 5, respectively. In a fourth row Row 4, the third antenna cell AC3, the first antenna cell AC1, the first antenna cell AC1, the first antenna cell AC1, and the third antenna cell AC3 may be disposed at a first column Col 1 to a fifth column Col 5, respectively. In a fifth row Row 5, the second antenna cell AC2, the third antenna cell AC3, the first antenna cell AC1, the third antenna cell AC3, and the second antenna cell AC2 may be disposed at a first column Col 1 to a fifth column Col 5, respectively.

The arrangement of the antenna cells as shown in FIG. 14 is merely an example, and the arrangement of the first to third antenna cells AC1, AC2, and AC3 may be modified in various ways. In some implementations, the first antenna cell AC1 may be disposed in the first area CR1 of FIG. 7, the second antenna cell AC2 may be disposed in the third area CR3 of FIG. 7, and the third antenna cell AC3 may be disposed in the second area CR2 of FIG. 7.

Referring to FIG. 15, a first impedance matching circuit 220*a*, a first rectifier 230*a*, and a first voltage converter 240*a* may be connected to the first antenna cell AC1.

Further, a second impedance matching circuit 220*b*, a second rectifier 230*b*, and a second voltage converter 240*b* may be connected to the second antenna cell AC2.

Further, a third impedance matching circuit 220*c*, a third rectifier 230*c*, and a third voltage converter 240*c* may be connected to the third antenna cell AC3.

In some implementations, the first impedance matching circuit 220*a* may be omitted, when desired. That is, unlike the second and third rectifiers 230*b* and 203*c*, the first rectifier 230*a* may be directly connected to the first antenna cell AC1 without the first impedance matching circuit 220*a*.

In some implementations, a separate first buffer circuit may be disposed between the first rectifier 230*a* and the first voltage converter 240*a* and may be configured to optimize the output load of the first rectifier 230*a* and the input impedance of the first voltage converter 240*a*.

Furthermore, a separate second buffer circuit may be disposed between the second rectifier 230*b* and the second voltage converter 240*b* and may be configured to optimize the output load of the second rectifier 230*b* and the input impedance of the second voltage converter 240*b*.

Furthermore, a separate third buffer circuit may be disposed between the third rectifier 230*c* and the third voltage converter 240*c* and may be configured to optimize the output load of the third rectifier 230*c* and the input impedance of the third voltage converter 240*c*.

The first voltage converter 240*a* may perform down-conversion on the output of the first rectifier 230*a* to generate an appropriate DC voltage for charging the battery 250.

The second voltage converter 240*b* may perform up-conversion on the output of the second rectifier 230*b* to generate an appropriate DC voltage for charging the battery 250.

The third voltage converter 240*c* may perform either down-conversion or up-conversion as needed on the output of the third rectifier 230*c* to generate an appropriate DC voltage for charging the battery 250.

Referring to FIG. 15 and FIG. 16, the first rectifier 230*a* may have rectification efficiency indicated by A depending on the power value of the input signal thereto. For example, the first rectifier 230*a* may have the maximum rectification efficiency E1 when the power value of the input signal thereto is P1. The second rectifier 230*b* may have rectification efficiency indicated by B depending on the power value of the input signal thereto. For example, the second rectifier 230*b* may have the maximum rectification efficiency E2 when the power value of the input signal thereto is P2. The third rectifier 230*c* may have rectification efficiency indicated by C depending on the power value of the input signal thereto. For example, the third rectifier 230*c* may have the maximum rectification efficiency E3 when the power value of the input signal thereto is P3.

In some implementations, the rectification efficiency E3 may be smaller than the rectification efficiency E1. The rectification efficiency E2 may be smaller than the rectification efficiency E3. However, implementations are not limited thereto.

In some implementations, the first rectifier 230*a* may be used to generate a DC voltage from the RF signal with a power of 20 dB or greater. The second rectifier 230*b* may be used to generate a DC voltage from the RF signal with a power of −10 dB or smaller. The third rectifier 230*c* may be used to generate a DC voltage from the RF signal with a power around 0 dB. However, implementations are not limited thereto.

Like the previously described implementation, the power receiving device 200 according to this implementation may perform the different rectification operations using the first to third rectifiers 230a to 230c with different rectification efficiency characteristics, and thus may have rectification efficiency characteristics as a combination of the rectification efficiency characteristics of the first to third rectifiers 230a to 230c. Accordingly, the rectification efficiency of the power receiving device 200 may be improved.

Figure 17:
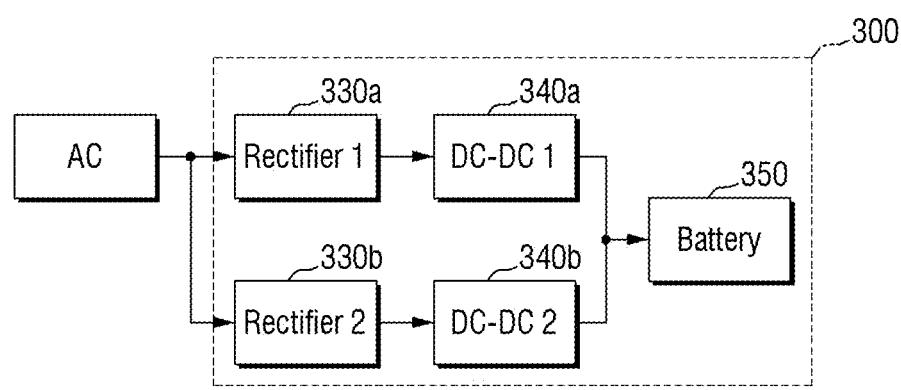
FIG. 17 is a diagram for illustrating another example of a power receiving device.

FIG. 17 is a diagram for illustrating another example of a power receiving device.

Hereinafter, descriptions that are duplicate with those of the previously described implementations will be omitted, and differences therebetween will be mainly described.

Referring to FIG. 17, a first rectifier 330a and a second rectifier 330b of a power receiving device 300 are connected to the same antenna cell AC. A first voltage converter 340a is connected to the first rectifier 330a and is used to charge a battery 350. The second voltage converter 340b is connected to the second rectifier 330b and is used to charge the battery 350.

In some implementations, the first voltage converter 340a and the second voltage converter 340b may be integrated into one voltage converter.

Since the rectification efficiency characteristics of the first rectifier 330a and the second rectifier 330b are different from each other, one of the first rectifier 330a and the second rectifier 330b may perform the rectification operation, and the other thereof may not perform the rectification operation, depending on the power value of the RF signal received through the antenna cell AC.

For example, it may be assumed that the first rectifier 330a is implemented to have the rectification efficiency characteristics as shown in FIG. 5 and the second rectifier 330b is implemented to have the rectification efficiency characteristics as shown in FIG. 6. In this case, when the power value of the RF signal received by the antenna cell AC is PR, the first rectifier 330a does not perform the rectification operation, and the second rectifier 330b performs the rectification operation to generate the DC voltage.

Alternatively, for example, it may be assumed that the first rectifier 330a is implemented to have the rectification efficiency characteristics as shown in FIG. 5 and the second rectifier 330b is implemented to have the rectification efficiency characteristics as shown in FIG. 6. In this case, when the power value of the RF signal received by the antenna cell AC is P2, the first rectifier 330a and the second rectifier 330b may respectively generate the DC voltages based on the respective rectification efficiencies.

That is, in the power receiving device 300 according to this implementation, the first rectifier 330a and the second rectifier 330b may respectively perform the rectification operations based on the respective rectification efficiency characteristics, depending on the power value of the RF signal received by the antenna cell AC, thereby generating the respective DC voltages to charge the battery 350.

Figure 18:
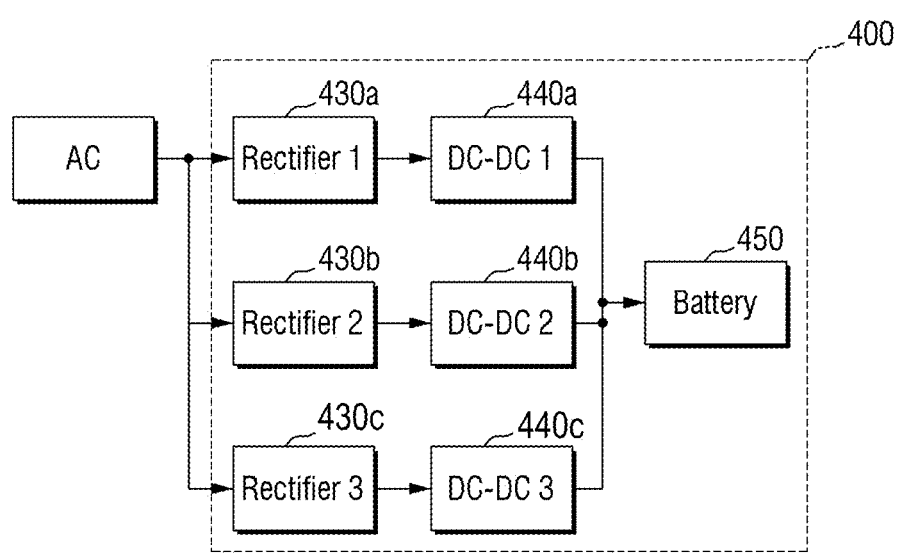
FIG. 18 is a diagram for illustrating another example of a power receiving device.

FIG. 18 is a diagram for illustrating another example of a power receiving device.

Hereinafter, descriptions that are duplicate with those of the previously described implementations will be omitted, and differences therebetween will be mainly described.

Referring to FIG. 18, a first rectifier 430a, a second rectifier 430b, and a third rectifier 430c of a power receiving device 400 are connected to the same antenna cell AC. A first voltage converter 440a is connected to the first rectifier 430a and is used to charge a battery 450. A second voltage converter 440b is connected to the second rectifier 430b and is used to charge the battery 450. A third voltage converter 440c is connected to the third rectifier 430c and is used to charge the battery 450.

In some implementations, the first voltage converter 440a, the second voltage converter 440b, and the third voltage converter 440c may be integrated into one voltage converter.

That is, in the power receiving device 400 according to this implementation, the first rectifier 430a, the second rectifier 430b, and the third rectifier 430c may respectively perform the rectification operations based on the respective rectification efficiency characteristics, depending on the power value of the RF signal received by the antenna cell AC, thereby generating the respective DC voltages to charge the battery 450.

Figure 19:
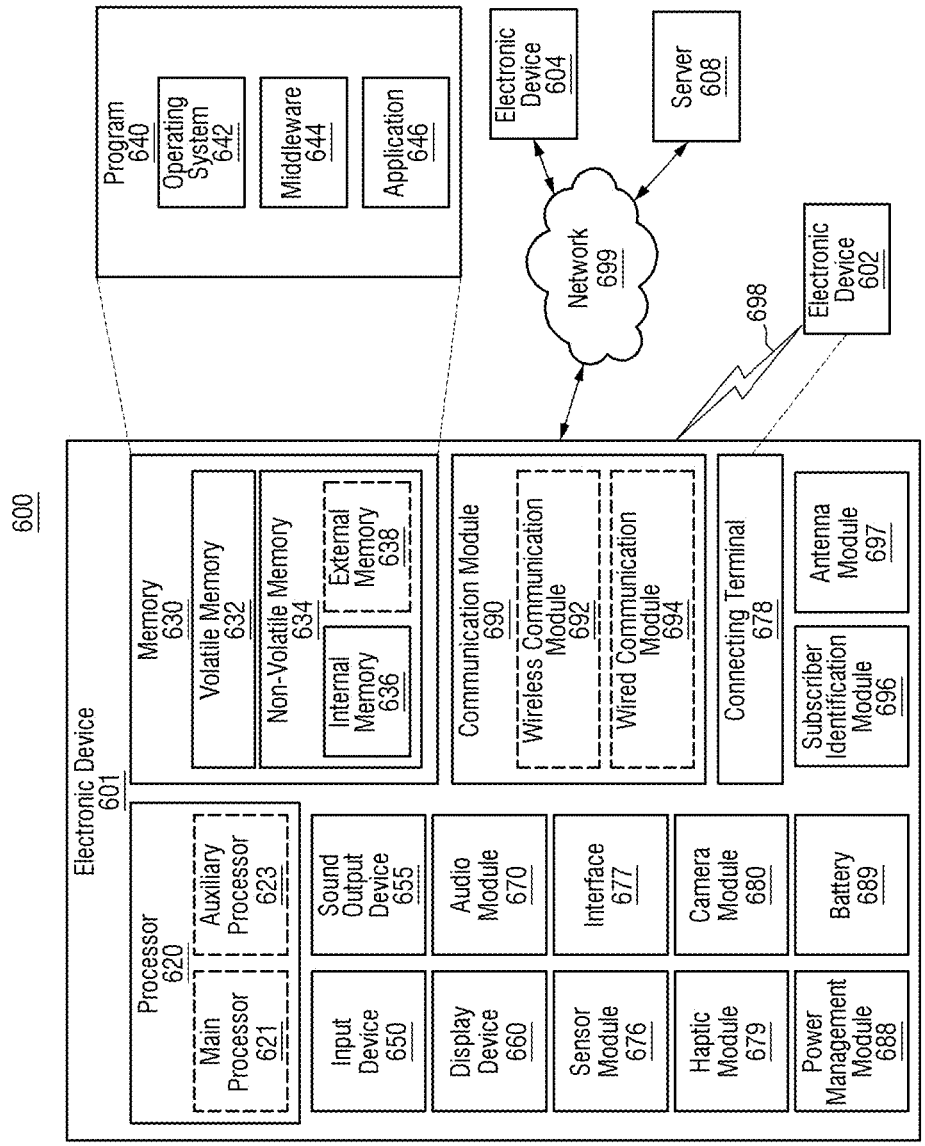
FIG. 19 is a block diagram of an example of an electronic device.

FIG. 19 is a block diagram of an example of an electronic device.

Referring to FIG. 19, an electronic device 601 in a network environment 600 communicates with an electronic device 602 over a first network 698, for example, a short-range wireless communication network, or communicates with an electronic device 604 or a server 608 over a second network 699 such as a long-range wireless communication network. In some implementations, the electronic device 601 is, for example, a notebook computer, a laptop computer, a portable mobile terminal, etc. However, implementations are not limited thereto.

In some implementations, each of the power receiving devices 100, 200, 300, and 400 as described above may be implemented as the electronic device 601. The transmission device 10 as described above may be implemented as the electronic device 602.

The electronic device 601 may communicate with the electronic device 604 via the server 608. The electronic device 601 may include a processor 620, a memory 630, an input device 650, a sound output device 655, an image display device 660, an audio module 670, a sensor module 676, an interface 677, a haptic module 679, a camera module 680, a power management module 688, a battery 689, a communication module 690, a subscriber identification module (SIM) 696 or an antenna module 697.

In some implementations, for example, at least one of components such as the display device 660 or the camera module 680 may be omitted from the electronic device 601, or at least one further component may be added to the electronic device.

In some implementations, some of the components may be implemented as a single integrated circuit (IC). For example, the sensor module 676 such as a fingerprint sensor, an iris sensor, and an illuminance sensor may be embedded in an image display device such as a display.

The processor 620 may execute software (for example, a program 640) that controls other components of at least one electronic device 601 such as a hardware or software component connected to the processor 620 to perform various data processing and computations.

Under data processing or at least some of computations, the processor 620 may load a command or data received from another component such as the sensor module 676 or the communication module 690 into a volatile memory 632, and process the command or data stored in the volatile memory 632, and store resulting data in a non-volatile memory 634.

The processor 620 may include, for example, a main processor 621 such as a central processing unit (CPU) or a smartphone application processor (AP) and an auxiliary processor 623 operating independently of the main processor 621 or in connection with the main processor 621.

The auxiliary processor 623 may include, for example, a graphic processing unit (GPU), an image signal processor (ISP), a sensor hub processor, or a communication processor (CP), etc. The graphic processing unit may act as an accelerator for processing the original model or the pruned model as described above.

In some implementations, the auxiliary processor 623 may be configured to consume less power or than that of the main processor 621 or perform certain functions. The auxiliary processor 623 may be separate from the main processor 621 or implemented as a portion thereof.

The auxiliary processor 623 may control at least some of functions or states related to at least one of the components of the electronic device 601 on behalf of the main processor 621 while the main processor 621 is inactive, or together with the main processor 621 while the main processor 621 is active.

The memory 630 may store therein various data used in at least one component of the electronic device 601. The various data may include, for example, software such as the program 640, and input data and output data for related commands. The memory 630 may include the volatile memory 632 and the non-volatile memory 634.

The program 640 may be stored as software in the memory 630, and may include, for example, an operating system (OS) 642, middleware 644, or an application 646.

The input device 650 may receive a command or data to be used for other components of the electronic device 601 from a device external to the electronic device 601. The input device 650 may include, for example, a microphone, mouse, or keyboard.

The sound output device 655 may output a sound signal out of the electronic device 601. The sound output device 655 may include, for example, a speaker or a receiver. The speaker may be used for general purpose of playing multimedia or recording a sound. The receiver may be used to receive an incoming call.

The image display device 660 may visually provide information out of the electronic device 601. The image display device may include, for example, a display, a hologram device, or a projector, and a control circuit for controlling a corresponding one of the display, the hologram device, or the projector.

In some implementations, the image display device 660 may include a touch circuit configured to detect a touch, or a sensor circuit configured to measure intensity of a force induced by the touch, for example, a pressure sensor.

The audio module 670 may convert a sound into an electrical signal or vice versa. In some implementations, the audio module 670 may obtain a sound via the input device 650 or output the sound via the sound output device 605 or a headphone of an external electronic device 602 directly or wirelessly connected to the electronic device 601.

The sensor module 676 may detect, for example, an operating state of the electronic device 601 such as output or temperature, or an environmental state external to the electronic device 601 such as a user's state, and may generate an electrical signal or data corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support at least one prescribed protocol to be used by the electronic device 601 directly or wirelessly connected to the external device 602. In some implementations, the interface 677 may include, for example, a high definition multimedia interface (HDMI), a universal serial bus (USB) interface, a secure digital (SD) card interface, or a voice interface.

A connection terminal 678 may include a connector through which the electronic device 601 may be physically connected to the external electronic device 602. In some implementations, the connection terminal 678 may include, for example, an HDMI connector, a USB connector, an SD card connector, or a voice connector such as a headphone connector.

The haptic module 679 may convert an electrical signal into a mechanical stimulus, for example, vibration or motion, which may be recognized by a user via a haptic sensation or a kinesthetic sensation. In some implementations, the haptic module 679 may include, for example, a motor, a piezoelectric element, or an electrical stimulator.

The camera module 680 may capture still images or moving images. In some implementations, the camera module 680 may include at least one lens, an image sensor, an image signal processor, or a flash.

The power management module 688 may manage power supplied to the electronic device 601. The power management module may be implemented, for example, as at least a portion of a power management integrated circuit (PMIC). In some implementations, the components of each of the power receiving devices 100, 200, 300, and 400 as described above may be implemented using some components of the power management module 688. However, implementations are not limited thereto.

The battery 689 may supply power to at least one component of the electronic device 601. In some implementations, the battery 689 may include, for example, a non-rechargeable primary battery, a rechargeable secondary battery, or a fuel cell.

The communication module 690 supports establishment of a direct communication channel or a wireless communication channel between the electronic device 601 and an external electronic device such as, for example, the electronic device 602, the electronic device 604, or the server 608, and communicates therewith via the established communication channel.

The communication module 690 may operate independently of the processor 620, and may include at least one communication processor supporting direct communication or wireless communication.

In some implementations, the communication module 690 may include, for example, a wireless communication module 692 such as a mobile communication (cellular communication module), a short-range wireless communication module, or a global navigation satellite system (GNSS) communication module, or a wired communication module 694 such as a local area network (LAN) communication module, or a power line communication (PLC) module.

A corresponding communication module among these communication modules may communicate with an external electronic device over the first network 698 such as, for example, blue-tooth Bluetooth™M, Wi-Fi (wireless-fidelity), direct or IrDA (standard of the Infrared Data Association) or the second network 699 such as, for example, the mobile communication network, the Internet, and the long-range communication network.

These various types of communication modules may be implemented, for example, as a single component or as a plurality of components separated from each other. The wireless communication module 692 may use, for example, subscriber information such as international mobile subscriber identity (IMSI) stored in the SIM 696 to identify and authenticate the electronic device 601 in a communication network such as the first network 698 or the second network 699.

The antenna module 697 may transmit or receive a signal or power to or from a device external to the electronic device 601. In some implementations, the antenna module 697 may include at least one antenna. Thus, at least one antenna suitable for a communication scheme used in a communication network such as the first network 698 or the second network 699 may be selected by the communication module 690. Then, the signal or power may be transmitted or received between the communication module and the external electronic device via the selected at least one antenna.

At least some of the aforementioned components may be interconnected to each other, and may communicate a signal therebetween in an inter-peripheral communication scheme such as, for example, a bus, a general purpose input and output (GPIO), a serial peripheral interface (SPI), or a mobile industry processor interface (MIPI).

In some implementations, the command or data may be transmitted or received between the electronic device 601 and the external electronic device 604 via the server 608 connected to the second network 699. Each of the electronic devices 602 and 604 may be of the same type as or a different type from that of the electronic device 601. All or some of the operations to be executed on the electronic device 601 may be executed on at least one external electronic device 602, 604, or 608. For example, all or some of the operations to be executed on the electronic device 601 may be executed on at least one external electronic device 602, 604, or 608.

For example, when the electronic device 601 is configured to perform a function or service automatically or in response to a request from a user or other device, the electronic device 601 executing the function or service may request at least one external electronic device to perform at least a portion of the function or service instead or in addition to the device 601. At least one external electronic device that has received the request may perform at least a portion of the requested function or service or an additional function or additional service related to the request, and transmit a result of the execution to the electronic device 601. The electronic device 601 provides the result as at least a portion of a response to the request with or without further processing of the result. For this purpose, for example, cloud computing, distributed computing, or client-server computing technologies may be used.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Although implementations of the present disclosure have been described with reference to the accompanying drawings, the present disclosure is not limited to the above implementations and may be executed in various different forms. Thus, a person with ordinary skill in the technical field to which the present disclosure belongs will be able to understand that the present disclosure may be implemented in other specific forms without changing the technical idea or essential characteristics of the present disclosure. Therefore, it should be understood that the implementations as described above are not restrictive but illustrative in all respects.

What is claimed is:

1. A power receiving device comprising:
   an antenna cell array configured to receive a radio frequency (RF) signal from a transmission device, wherein the antenna cell array includes a first antenna cell disposed in a center area of the antenna cell array and a second antenna cell disposed in an edge area of the antenna cell array;
   a first rectifier connected to the first antenna cell and having first maximum rectification efficiency when an input signal of the first rectifier has a first power value;
   a second rectifier connected to the second antenna cell and having second maximum rectification efficiency when an input signal of the second rectifier has a second power value different from the first power value;
   a first voltage converter configured to perform a first conversion of an output of the first rectifier; and
   a second voltage converter configured to perform a second conversion of an output of the second rectifier.

2. The power receiving device of claim 1, wherein the first power value is greater than the second power value.

3. The power receiving device of claim 1, wherein the first rectifier is disconnected from the second antenna cell, and the second rectifier is disconnected from the first antenna cell.

4. The power receiving device of claim 1, wherein the transmission device is configured to transmit the RF signal using beam forming.

5. The power receiving device of claim 4, wherein the transmission device is configured to transmit the RF signal using a time-reversal algorithm.

6. The power receiving device of claim 1, wherein the first rectifier and the second rectifier have different circuit configurations.

7. The power receiving device of claim 6, wherein the first rectifier is a Schottky diode circuit, a 2 Dickson charge pump circuit, or a bridge rectification circuit, and
   wherein the second rectifier is the Schottky diode circuit, the 2 Dickson charge pump circuit, or the bridge rectification circuit, and is different from the first rectifier.

8. The power receiving device of claim 1, wherein the first rectifier comprises a first substrate including a first material, and
   wherein the second rectifier comprises a second substrate including a second material different from the first material.

9. The power receiving device of claim 8, wherein the first material includes Si, and the second material includes an oxide semiconductor material including at least one of GaN or GaAs.

10. The power receiving device of claim 1, wherein the first conversion includes down-conversion of the output of the first rectifier, and wherein the second conversion includes up-conversion of the output of the second rectifier.

11. The power receiving device of claim 1, comprising:
a first impedance matching circuit configured to deliver the RF signal received by the first antenna cell to the first rectifier; and
a second impedance matching circuit configured to deliver the RF signal received by the second antenna cell to the second rectifier.

12. The power receiving device of claim 1, wherein the antenna cell array includes a third antenna cell disposed between the first antenna cell and the second antenna cell, and wherein the power receiving device comprises:
a third rectifier connected to the third antenna cell and having third maximum rectification efficiency when an input signal of the third rectifier has a third power value different from the first power value and the second power value; and
a third voltage converter configured to perform a third conversion of an output of the third rectifier.

13. The power receiving device of claim 12, wherein the first power value is greater than the third power value, and the third power value is greater than the second power value.

14. The power receiving device of claim 12, comprising:
a first impedance matching circuit configured to deliver the RF signal received by the second antenna cell to the second rectifier; and
a second impedance matching circuit configured to deliver the RF signal received by the third antenna cell to the third rectifier,
wherein the first rectifier is directly connected to the first antenna cell without an impedance matching circuit.

15. The power receiving device of claim 12, wherein the third conversion is different from either the first conversion or the second conversion.

16. A method for receiving power, the method comprising:
receiving, by an antenna cell array, a radio frequency (RF) signal from a transmission device, wherein the antenna cell array includes a first antenna cell disposed in a center area of the antenna cell array and a second antenna cell disposed in an edge area of the antenna cell array;
performing, by a first rectifier, a first rectification of the RF signal received through the first antenna cell, wherein the first rectifier has first maximum rectification efficiency when an input signal of the first rectifier has a first power value;
performing, by a second rectifier, a second rectification of the RF signal received through the second antenna cell, wherein the second rectifier has second maximum rectification efficiency when an input signal of the second rectifier has a second power value different from the first power value;
performing, by a first voltage converter, a first conversion of an output of the first rectifier;
performing, by a second voltage converter, a second conversion of an output of the second rectifier, wherein the second conversion is different from the first conversion; and
charging a battery using an output of the first voltage converter and an output of the second voltage converter.

17. The method of claim 16, wherein the first rectifier and the second rectifier have different circuit configurations, or the first rectifier and the second rectifier are formed using different substrates including different materials.

18. The method of claim 16, wherein the first conversion includes down- conversion of the output of the first rectifier, and wherein the second conversion includes up-conversion of the output of the second rectifier.

19. The method of claim 16, wherein the antenna cell array includes a third antenna cell disposed between the first antenna cell and the second antenna cell, and wherein the method comprises:
performing, by a third rectifier, a third rectification of the RF signal received through the third antenna cell, wherein the third rectifier has third maximum rectification efficiency when an input signal of the third rectifier has a third power value different from the first power value and the second power value; and
performing, by a third voltage converter, a third conversion of an output of the third rectifier.

20. A power receiving device comprising:
an antenna cell configured to receive a radio frequency (RF) signal from a transmission device;
a first rectifier connected to the antenna cell and having first maximum rectification efficiency when an input signal of the first rectifier has a first power value;
a second rectifier connected to the antenna cell and having second maximum rectification efficiency when an input signal of the second rectifier has a second power value different from the first power value, wherein the first rectifier and the second rectifier have different circuit configurations; and
a voltage converter configured to convert at least one of an output of the first rectifier or an output of the second rectifier to obtain a converting result and to charge a battery using the converting result.

* * * * *